United States Patent [19]

Derzhavets et al.

[11] 3,944,489

[45] Mar. 16, 1976

[54] APPARATUS FOR PUMPING OIL-WATER MIXTURE FROM A COLLECTION VESSEL OF A FLOATING OIL COLLECTOR INTO SETTLING TANKS

[76] Inventors: Abram Yakovlevich Derzhavets, prospekt Gagarina, 4, kv. 5; Petr Grigorievich Kogan, ulitsa Perekopskoi divizii, 2, kv. 14; Viktor Iosifovich Tabachnikov, ulitsa Varnenskaya 19, korpus 8, kv. 31, all of Odessa, U.S.S.R.

[22] Filed: June 1, 1973

[21] Appl. No.: 366,212

[52] U.S. Cl......... 210/242 R; 210/DIG. 25; 210/406
[51] Int. Cl.² ......................................... E02B 15/04
[58] Field of Search ...... 210/83, 242, DIG. 21, 115, 210/406

[56] References Cited
UNITED STATES PATENTS

| | | | |
|---|---|---|---|
| 1,948,543 | 2/1934 | Samiran | 210/115 |
| 3,425,556 | 2/1969 | Vollter | 210/115 |
| 3,578,171 | 5/1971 | Lisher | 210/242 |
| 3,727,766 | 4/1973 | Horne et al. | 210/242 |
| 3,760,944 | 9/1973 | Bell et al. | 210/DIG. 21 |

FOREIGN PATENTS OR APPLICATIONS

| | | | |
|---|---|---|---|
| 96,580 | 1/1961 | Netherlands | 210/115 |

Primary Examiner—Theodore A. Granger
Attorney, Agent, or Firm—Haseltine, Lake & Waters

[57] ABSTRACT

Apparatus for pumping oil-water mixture from the collection vessel of a floating oil collector into settling tanks comprises at least one oil receiving means for collecting oil-water mixture, arranged below the level of the liquid in the collection vessel and connected through a conduit to the upper part of one of the settling tanks. Besides, the apparatus includes means providing for vertical displacement of the oil receiving means and a pump for pumping water from the lower part of one of the settling tank outboard of the floating oil collector and an aspirating air-water jet ejector for maintaining substantially permanent vacuum in each settling tank. The ejector has the air line thereof connected to the upper part of each settling tank and the jet thereof connected to the delivery side of the pump. The lower part of one of the settling tanks is connected to the upper part of that settling tank from the lower part of which this pump draws water. The liquid column established in the conduit connecting the oil receiving means with the upper part of the said settling tank is higher than the liquid column established in said other conduit.

2 Claims, 1 Drawing Figure

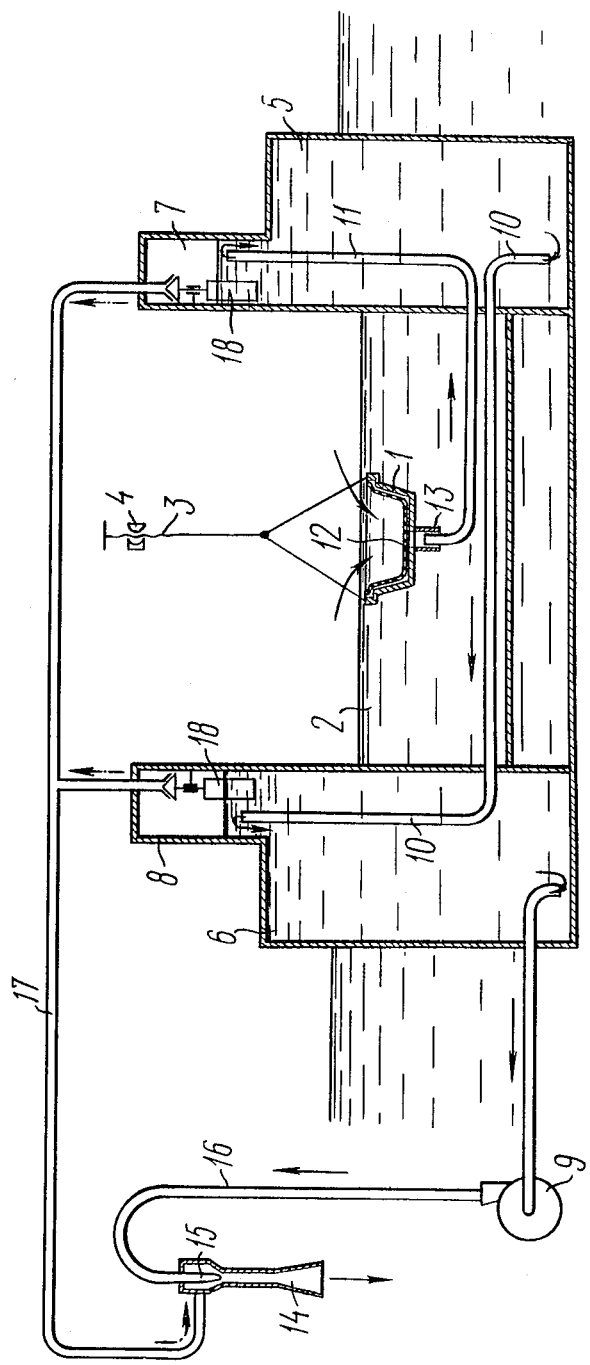

APPARATUS FOR PUMPING OIL-WATER MIXTURE FROM A COLLECTION VESSEL OF A FLOATING OIL COLLECTOR INTO SETTLING TANKS

The present invention relates to equipment for cleaning the surface of water basins, such as ports, docks, weirs, etc. from debris and other polluting matter floating on this surface, such as oil and oil products, and, more particularly, it relates to apparatus for pumping of oil-water mixture from the collection vessel of a floating oil and debris collector into settling tanks.

The present invention can be employed to utmost advantage in floating oil collector ships wherein pumping of oil-water mixture into the settling tanks is effected by means of centrifugal pumps.

Known in the art is an apparatus for pumping oil-water mixture from the collection vessel of a floating oil collector into the settling tanks, mounted in the oil collecting ship manufactured by the Shell company of Holland.

This known apparatus comprises an oil receiving means for collecting oil-water mixture, mounted below the liquid level within the collection vessel. The oil receiving means is movable in a vertical plane by means of floats secured to its housing. The oil receiving means can be placed positively so that water alone should get thereinto. The oil receiving means communicates with the settling tank via a conduit. Oil-water mixture is pumped from the collection vessel into the settling tanks by means of a pump. The same pump pumps water from the collection vessel outboard. To provide for permanent draught of the oil collector ship, the settling tanks are pre-filled with water.

In operation of this known apparatus the process of separation of oil from water by gravity takes relatively long time. There takes place in the flow part of the centrifugal pump intensive mixing of oil and water, which substantially prolongs the time of gravity separation of oil from water in the settling tanks. This fact affects the productivity of the oil collector.

It is an object of the present invention to increase the productivity of an oil and debris collector ship by directing oil-water mixture from the oil receiving means to the settling tanks, bypassing the pump.

It is another object of the present invention to reduce the percentage of water in the oil collected in the settling tanks.

It is still another object of the present invention to provide for reduction of the volume of the settling tanks, without affecting the output thereof.

With these and other objects in view, the present invention resides in that, according to the invention, the apparatus for pumping oil-water mixture from a collection vessel of a floating oil collector into settling tanks, comprises: at least one oil receiving means for collectiing oil-water mixture, arranged below the level of the liquid in said collection vessel; means providing for vertical displacement of said oil receiving means; a pump for pumping water from the lower part of one of said settling tanks outboard of said floating oil collector; an aspirating air-water jet ejector for maintaining substantially permanent vacuum in each said settling tank, having the air line thereof connected to the upper part of each said settling tank, said ejector having the jet nozzle thereof connected to the delivery side of said pump; a conduit connecting said oil receiving means with the upper part of one of said settling tanks, a second conduit connecting the lower part of said one settling tank having the upper part thereof connected by said first-mentioned conduit with said oil-receiving means, to the upper part of another said settling tank from said lower part of which said pump draws water, the water column established in said first-mentioned conduit connecting said oil-receiving means with said upper part of said one settling tank being higher than the water column established in said second conduit.

In the herein disclosed apparatus oil-water mixture finds its way from the oil receiving means to the settling tanks, by-passing the pump. This fact reduces considerably the turbulence of the oil-water mixture flow, which cuts down the time of separation by gravity of oil and water in the settling tanks, and, hence, increases the productivity of the oil collector ship. Furthermore, the reduced turbulence of the oil-water mixture brings down the percentage of water in the oil reclaimed in the settling tanks. This reduction of the percentage of water in oil reclaimed in the settling tanks enables either to reduce the volume of the settling tanks, while maintaining their output, or else to step up the output of the settling tanks without increasing their size.

It is advisable to employ settling tanks provided each in the upper part thereof with an additional vessel of which the height is substantially greater than the width, the volume of this additional vessel being substantially smaller than that of the respective settling tank.

The provision of these additional vessels in the settling tanks enables the maintenance of a pressure head sufficient for the oil-water mixture to flow from one settling tank into another, owing to the difference of the liquid levels. In this way the difference between the volumes of the settling tanks is minimal, which creates minimal heeling torque applied to the ship.

An apparatus for pumping oil-water mixture from a collection vessel from a floating oil collector ship into the settling tanks thereof, constructed in accordance with the invention, has been found to provide for a capacity (by oil) of the settling tanks from 3 to 4 tons per hour, in an oil collector ship of a displacement of about 45 tons.

Other objects and advantages of the present invention will be made apparent in the following detailed description of an embodiment of the present invention, with reference being had to the appended drawing showing schematically a cross-sectional view of an apparatus for pumping oil-water mixture from a collection vessel of an oil collector ship into the settling tanks, constructed in accordance with the invention.

In the drawing, the apparatus for pumping oil-water mixture from the collection vessel of a floating oil collector ship into the settling tanks comprises an oil-receiving means 1 for receiving therein the oil-water mixture, arranged below the level of the liquid within the collection vessel 2. The oil receiving means 1 is displaceable in a vertical direction by means of a screw-nut couple including a screw 3 pivotally connected to the oil receiving means 1 and a nut 4.

Two settling tanks 5 and 6 are provided in their respective upper parts with additional vessels 7 and 8, respectively. The dimensions of each one of these additional vessels 7 and 8 are such that the height thereof is substantially greater than its width, while the volume of the additional vessel is considerably smaller than that of the associated tank.

The settling tank 5 with its additional vessel 7 and the settling tank 6 with its additional vessel 8 are pre-filled with water. To pump water from the lower part of the settling tank 6 there is employed a centrifugal pump 9. The additional vessel 8 of the settling tank 6 is connected via a conduit 10 to the lower part of the settling tank 5. The additional vessel 7 of the settling tank 5 is connected via a conduit 11 to the oil receiving means 1.

The oil receiving means 1 is provided with a mesh screen 12 to prevent accidental access of debris thereinto. Furthermore, the oil receiving means 1 is connected to the conduit 11 by a telescopic connection 13.

To maintain substantially permanent degree of vacuum within each settling tank 5 and 6, there is used an aspirating air-water jet ejector 14. The jet nozzle 15 of the aspirating air-water jet ejector 14 is connected to the delivery side of the centrifugal pump 9 via a conduit 16. The air aspiration line of the air-water jet ejector 14 is connected via another conduit 17 to the air cushion within each one of the additional vessels 7 and 8 of the settling tanks 5 and 6. To close off this conduit 17, a float-operated valve 18 is installed in each one of the additional vessels 7 and 8. To facilitate operation, each one of the additional vessels 7 and 8 is associated with a level indicator of any known appropriate type (not shown in the drawing).

The oil receiving means 1 communicates via the conduit 11 with the settling tank 5 so that the upper edge or outlet of the conduit 11 is disposed approximately in the middle of the height of this additional vessel 7 of this tank 5. The lower part of this settling tank 5 communicates via the conduit 10 with the additional vessel 8 of the settling tank 6 so that the upper edge or outlet of the conduit 10 is below the upper edge or outlet of the conduit 11 by an extent sufficient for a difference between the levels of the liquid in the two tanks, providing for a gravity flow of the liquid from the settling tank 5 into the settling tank 6.

The herein disclosed apparatus for pumping oil-water mixture from the collection vessel of a floating oil-collector ship into the settling tanks operates, as follows.

The centrifugal pump 9 draws water from the lower part of the settling tank 6 and delivers it through the conduit 16 to the jet nozzle 15 of the aspirating air-water jet ejector 14.

Consequently, the aspirating air-water jet ejector 14 draws the air via the conduit 17 from the air cushions of the additional vessels 7 and 8, respectively, of the settling tanks 5 and 6 and thus creates a predetermined degree of vacuum therein.

When the liquid level in the settling tank 6 falls on account of the operation of the pump 9, water flows from the lower part of the settling tank 5 via the conduit 10 into the settling tank 6.

When the degree of vacuum within each tank 5 and 6 attains a value in excess of the differential water column between the liquid level in the collection vessel 2 and the water level within the settling tank 5, oil-water mixture is drawn from the collection vessel 2 through the oil receiving means 1 and the conduit 11 into the settling tank 5.

Within the settling tank 5 there takes place separation by gravity of the oil and water, the separated oil, as it gradually fills the settling tank 5, driving water via the conduit 10 into the settling tank 6.

As the separated oil fills completely the settling tank 5, the oil flows through the conduit 10 and fills the settling tank 6. The operation of oil collection is continued, until oil appears from the air-water jet ejector 14.

Should any air find its way into the oil receiving means 1, the air gets via the conduit 11 into the settling tank 5 wherefrom it is drawn through the conduit 17 by the aspirating air-water jet ejector 14.

The vertical position of the oil receiving means 1 within the collection vessel 2 is adjusted by means of the screw 3 and nut 4 to correspond to the thickness of the oil layer within this collection vessel.

What is claimed is:

1. An apparatus for pumping oil-water mixture from a collection vessel of a floating oil collector into settling tanks, comprising: closed settling tanks, at least one oil receiving means for collecting oil-water mixture, arranged below the level of the liquid in said collection vessel; means providing for vertical displacement of said oil receiving means; a pump for pumping water from the lower part of one of said settling tanks outboard of said floating oil collector; an aspirating air-water jet ejector for maintaining substantially permanent vacuum in each said settling tank, said ejector having the air line thereof connected to the upper part of each said settling tank, said ejector having the jet nozzle thereof connected to the delivery side of said pump; a conduit connecting said oil receiving means with the upper part of one of said settling tank; a second conduit connecting the lower part of said one settling tank having the upper part thereof connected by said first-mentioned conduit with said oil-receiving means, to the upper part of another said settling tank from said lower part of which said pump is connected to pump water, the water column established in said first-mentioned conduit connecting said oil-receiving means with said upper part of said one settling tank being higher than the water column established in said second conduit.

2. An apparatus as claimed in claim 1, wherein each said settling tank is associated in the upper part thereof with an additional vessel having such dimensions that the height of said additional vessel is substantially greater than the width thereof, while the volume of said additional vessel is substantially smaller than the volume of said settling tank.

* * * * *